United States Patent [19]

Sassenrath

[11] Patent Number: 5,293,606

[45] Date of Patent: Mar. 8, 1994

[54] APPARATUS AND METHOD FOR TRANSFERRING INTERLEAVED DATA OBJECTS IN MASS STORAGE DEVICES INTO SEPARATE DESTINATIONS IN MEMORY

[75] Inventor: Carl E. Sassenrath, Ukiah, Calif.

[73] Assignee: Commodore Electronics Limited, Nassau, The Bahamas

[21] Appl. No.: 679,371

[22] Filed: Apr. 2, 1991

[51] Int. Cl.$^5$ .............................................. G06F 12/04
[52] U.S. Cl. ............................ 395/425; 364/DIG. 1; 364/251.5; 364/254.2; 364/254.3; 364/254.9
[58] Field of Search ........................... 395/400, 425; 364/200 MS File, 900 MS File; 365/49

[56] References Cited

U.S. PATENT DOCUMENTS

| | | | |
|---|---|---|---|
| 4,665,482 | 5/1987 | Murray, Jr. et al. | 395/425 |
| 4,896,261 | 1/1990 | Nolan | 395/325 |
| 4,903,195 | 2/1990 | Homma | 395/425 |
| 4,964,128 | 10/1990 | Sako et al. | 371/39.1 |

*Primary Examiner*—Joseph L. Dixon
*Assistant Examiner*—Hiep T. Nguyen
*Attorney, Agent, or Firm*—Townsend and Townsend Khourie and Crew

[57] ABSTRACT

A system for transferring interleaved data objects in mass storage devices into separate destinations in a system memory is described. The method includes the steps of determining for each of the data objects a destination address and a size; one time seeking of a data object from a location of the mass storage means; transferring data from the data object into the destination address, wherein the data has a size equal to the size for the data object; and repeating the transferring step for subsequent data objects.

7 Claims, 8 Drawing Sheets

APPARATUS AND METHOD FOR TRANSFERRING INTERLEAVED DATA OBJECTS IN MASS STORAGE DEVICES INTO SEPARATE DESTINATIONS IN MEMORY

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of data storage. More particularly, the invention relates to data transfer from computer storage media, such as CD-ROM optical storage disks.

Optical storage media in the form of disks are well known as an alternative to magnetic storage media. The disks, commonly known as "compact disks" or "CD's," have a substrate containing pits for storing data. A pit is about 0.5 μm wide, and a disk can hold billions of pits. The pits are aligned in a spiral track similar to the spiral groove in a conventional record. The CD pit track, however, runs from the inside diameter of the disk to the outside.

Information is stored in binary form by the particular arrangement of pits on the plastic substrate. Binary data are encoded in the transitions from the pits and the flat areas ("land") between the pits. The surface is metallized to reflect a laser beam used to read the data.

A specially-designed compact disk player is used to retrieve data stored on a compact disk. The player operates by focusing a laser beam on the reflective metal through a substrate and then detecting the reflected light. The pits increase the optical path of the laser beam by an amount equivalent to one-half wavelength, thereby producing destructive interference when combined with other (non-shifted) reflected beams. Data are read from the disk as a change in intensity of reflected laser light. The reflected light is detected by an optical pick-up or stylus, and the data carried on the beam are converted to digital electrical signals. Further description of the pits and how they function is generally available; see, e.g., Watkinson, *The Art of Digital Audio*, Focal Press, Chapter 13.

Several different CD formats exist. Perhaps the best known is the CD-Digital Audio (CD-DA) format used for musical recordings. Despite the general association of CD's with music, the media is well suited for other applications. Computer software or other published materials can be stored in a read-only format and delivered as data or video signals in addition to just audio signals.

One such format is CD-ROM which is set forth in Philips/Sony *Yellow Book* of October 1983. Additional specifications for CD-ROM may be found in the High Sierra specification (from the High Sierra Conference, November 1985) and the more recent ISO (International Standards Organization) 9660 format. While the CD-ROM data format is similar to that of CD-Digital Audio, the disks are not compatible. Other popular formats include the CD-I format (Green Book) which is an interactive, multi-media format and the DVI format which stores full-motion video and audio.

The compact disk is a remarkable storage medium capable of holding over half a gigabyte of storage. However, with this massive storage capability comes the increased difficulty of retrieving the data—metaphorically, locating a kilobyte needle in a gigabyte haystack. Particularly, optical disk systems suffer from slower data access, due in large part to the increased time required for seeking out given data (seek time). As a result, data transfer times for optical disks are substantially longer than for their magnetic counterparts.

Several factors contribute to longer seek times. Part of the problem is due to the design of current optical pickups. For example, moving a head mass of 100 g across a disk in 20 ms has proved difficult. Tracking difficulties also increase the access time. Since the track pitch on an optical disk is so small, the servo must be extremely precise. The required precision is more easily achieved at slower disk rotation. Unlike standard LP records, the rotational rate for CD's is radially dependent, thus the drive motor must also change speed during a seek operation—further adding to seek time. With longer seek times and hence total transfer times, current optical disk systems do not provide access to their data on a real-time basis.

While current mass storage media, such as CD-ROM, provide exceptional storage capability, they cannot be thought of as truly random access media. What is needed is a system which improves data transfer for these media. It is particularly desirable to have a system capable of providing full-color video and stereo sound in real-time. The present invention fulfills this and other needs.

SUMMARY OF THE INVENTION

Apparatus and methods for transferring interleaved data objects into separate destinations in memory are described. Recognizing the penalty incurred by seeking, the present invention improves data transfer by minimizing seek time. As much data as possible are read in a single read operation.

One method of the present invention for transferring data objects comprises building a transfer list of nodes, wherein each node has a destination address and a size for one of the data objects; reading a data object from a location of the mass storage means; reading a node from the transfer list; and transferring data from the data object into memory according to the destination address and size specified in the current node.

There are several advantages to using the methods of the present invention. There is complete flexibility in ordering and selecting memory locations for data buffers. Transfer lists can be built anywhere in memory. Because the nodes are linked together at run time, the order of nodes can be created and modified to suit one's particular requirements.

DESCRIPTION OF THE SPECIFIC EMBODIMENTS

Introduction

Figure 1:
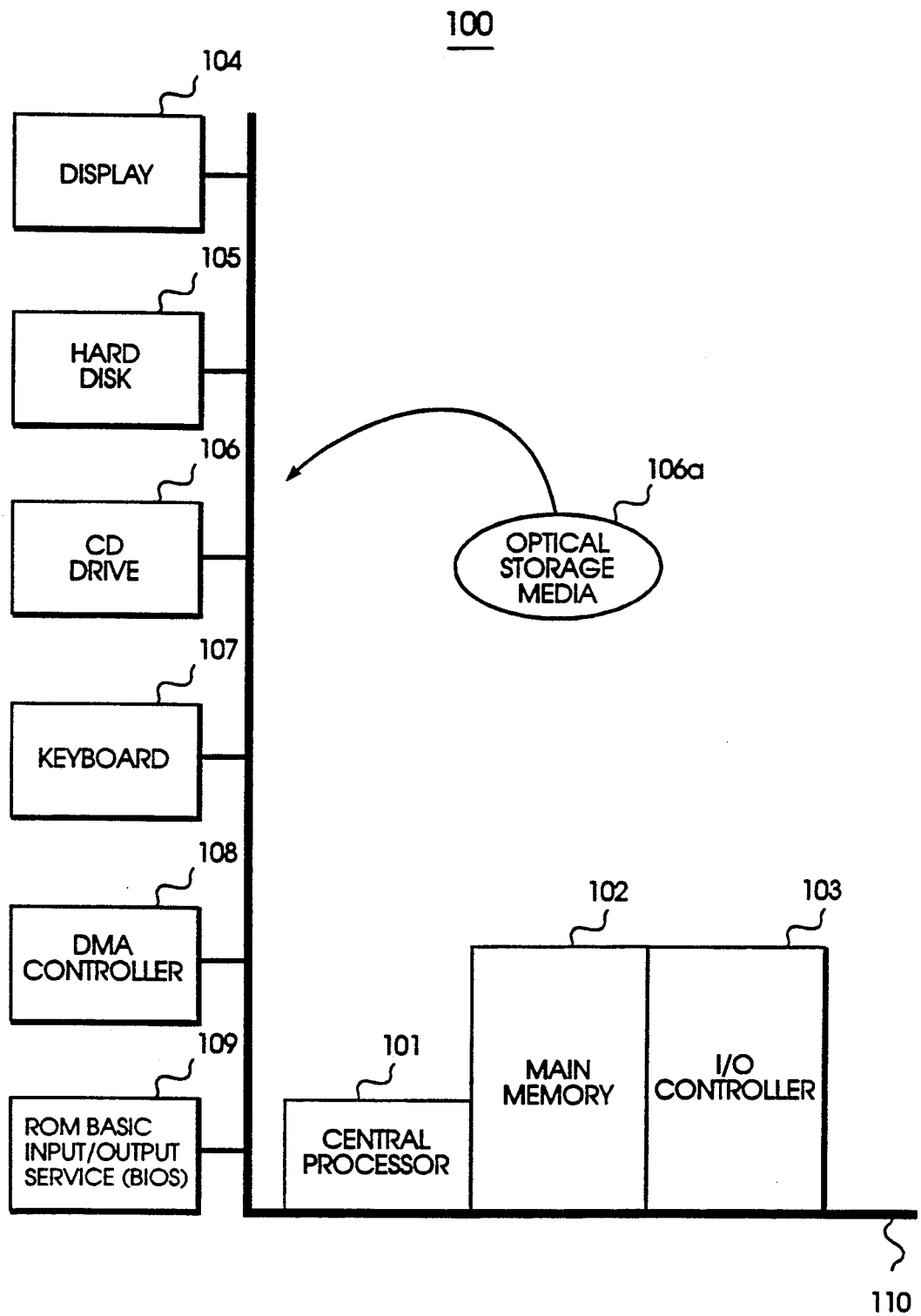
FIG. 1 is a a block diagram of a computer system in which the present invention may be embodied.

Data transfer from a compact disk depends on several factors, many of which may be quantified. The total transfer time for a given group of data blocks includes not only the time required to transfer the data into memory (data transfer time), but also the delay incurred in reaching the desired blocks on the disk (seek time). The former depends on the drive's frame rate and the disk's sector size. The latter depends on such factors as head mass and servo accuracy. A frame is the basic unit of data representation. In CD-DA, for example, this would include synchronization, subcode, audio data, and error detection and correction. A sector is a block or frame complete with synchronization and header field; in CD-ROM a sector is a 2352 byte block, 2048 of which is user data. (See, e.g., Pohlmann, K., *The Compact Disk: A Handbook of Theory and Use*, Vol. 5, A-R Editions, Inc., 1989.)

The current technology for CD mechanisms offers a frame rate of 75 frames/second (f/s)—also the rate required to produce full quality digital audio. The sector size used for holding a frame is approximately 2k bytes, but it may be increased when complete error correction is not required. A theoretical data transfer rate can be calculated as follows:

$$75 f/s * 2k/f = 150k/s$$

While CD drive specifications typically list a maximum seek time of 0.8 seconds and an average time of 0.5 seconds, the minimum seek time rarely, if ever, approaches zero since the laser is not located where it is needed—directly before the desired starting point.

The total transfer time for a read is calculated by dividing the data transfer rate into the quantity of data and adding the seek time. Thus, for example, the total transfer time for a 48k read with an average seek time would take:

$$(48k / 150k/s) + 0.5s = 0.82s$$

In this case, 61% of the total time is spent in the seek alone.

Seek times may also be conveniently related to data sizes. Thus, an average seek is equivalent to the transfer of:

$$150k/s * 0.5s = 75k$$

When many such transfers occur, the loss accumulates and greatly degrades the performance of the program. For a program transferring ten full-color video images and 20 seconds of stereo sound, even with the data clustered together to reduce the seek time to 0.25 seconds, a transfer time of 15 seconds is required:

Size of each full-color image = 48k
Size of each second of stereo sound = 32k
((48k / 150k/s) + 0.25s) * 10 = 5.7s
((32k / 150k/s) + 0.25s) * 20 = 9.3s
Total transfer time = 15s
Total data transferred = 1120k
Total transfer rate = 75k/s In the foregoing example, if a single read were achievable, i.e., only one seek, the transfer rate is effectively doubled (and the transfer time is halved):

(48k / 150k/s) * 10 = 3.2s
(32k / 150k/s * 20 = 4.3s
Total transfer time = 7.5s + 0.5s = 8s
Total data transferred = 1120k
Total transfer rate = 140k/s This example, of course, requires that the data are organized on sequential sectors of the disk.

A particular problem in prior techniques with eliminating seeks is that programs often need to read several different data objects, e.g., graphics, sound, music, text, code, etc., into different memory locations. In addition, the data may be of different sizes. One approach would be to read data from the disk into an intermediate memory buffer which is then distributed to other locations. This approach, however, requires moving the data twice; it also requires substantial allocation of memory for intermediate buffers.

Recognizing the penalty incurred by seeking, the present invention improves data transfer by minimizing seek time. As much data as possible are read in a single read operation, even if this includes discarding some of the data. Since the data transfer cost of an average seek is relatively expensive, about 75k, a lot of data can be discarded with little or no penalty.

A Preferred Embodiment

The invention may be embodied on a general purpose digital computer system, such as a computer system 100 of FIG. 1, which comprises a central processor 101, a main memory 102, an input/output controller 103, a display monitor 104, a fixed or hard disk 105, an optical storage or CD drive 106 with removable optical storage media 106a, keyboard 107, Direct Memory Access (DMA) controller 108, and ROM BIOS (Read-only memory, basic input/output service) 109. The various components communicate through a system bus 110 or similar architecture.

In operation, the user enters commands through keyboard 107 and/or other input devices, e.g., a mouse. The computer displays results on display 104, such as a cathode ray tube or a printer. In the preferred embodiment, an appropriately programmed Amiga 500 personal computer (Commodore International, West Chester, Pa.) is used.

While a preferred embodiment is described with reference to a particular media, a wide variety of storage media may be employed, including magnetic, optical, optical-magnetic, and flash memory techniques, and the present invention is not limited to any particular technique. Moreover, the present invention is also compatible with virtually any system employing mass storage means where different objects of data can be contiguously or sequentially arranged (interleaved). Of particular interest to the present invention, though, are optical storage media which are compromised by slow data transfer, such as CD-ROM and WORM (write once, read many).

Figure 2:
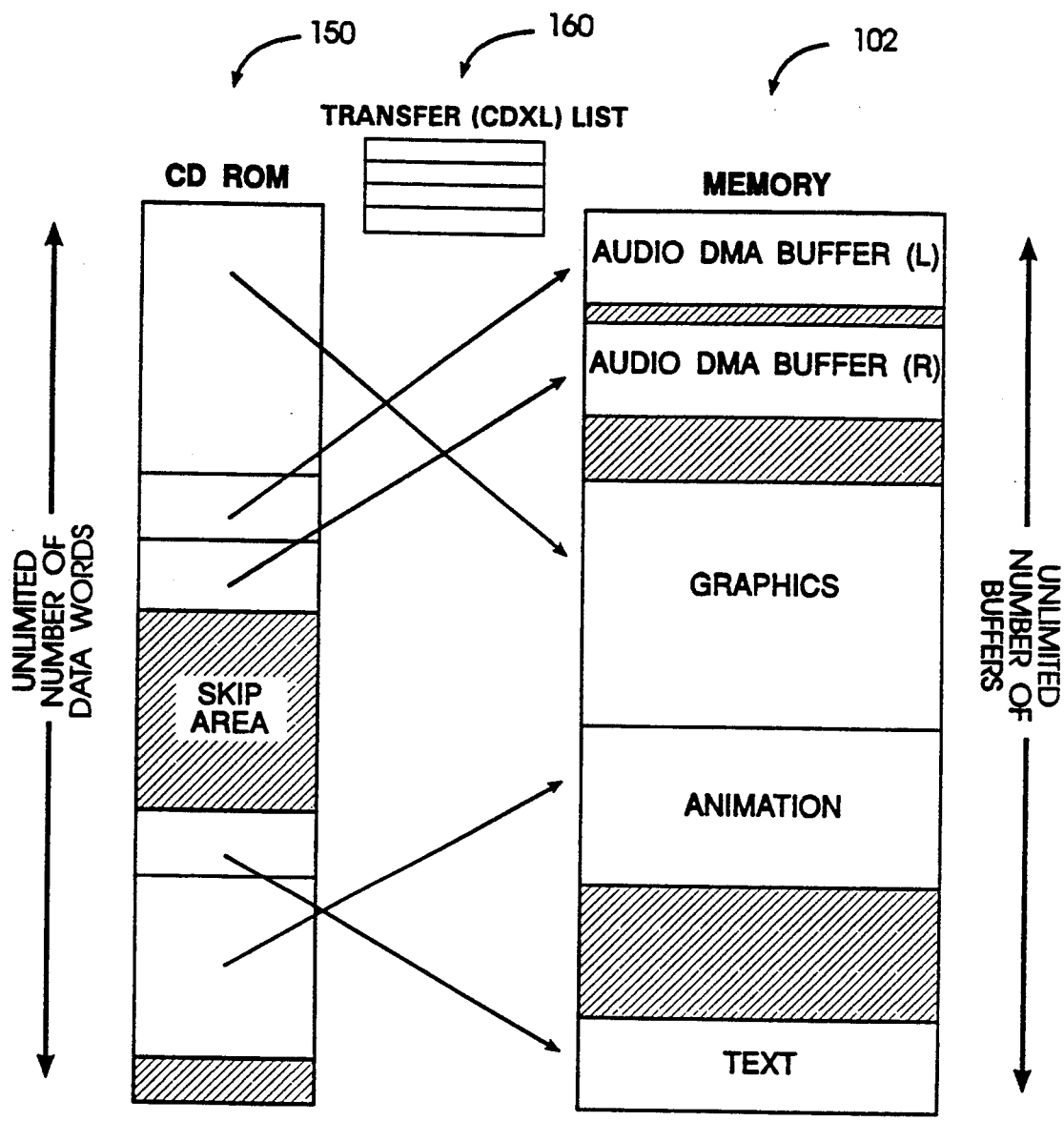
FIG. 2 is a block diagram illustrating the transfer of data via CDXL transfer lists.

According to the present invention, methods are provided which distribute data objects into multiple memory locations. The data objects can be any desired information. Furthermore, they need not be homologous, i.e., they may be different information contents such as audio and video information. As illustrated in FIG. 2, a transfer list (CDXL List) 160 is constructed which controls data "de-interleaving" and "scattering." Data objects of any length and any category or group can be read (de-interleaved) from media 106a, e.g., CD-ROM 150, and placed (scattered) anywhere in memory 102 with a single high-speed DMA transfer. For example, software, audio, graphics, and text data objects are stored together as a group. Transfer lists of the present invention allow developers to specify the size and placement of data during a continuous read operation. Lists may be constructed in advance, at runtime, or even during a read operation. During data transfer, each data object is extracted and scattered to its appropriate destination in memory without using intermediate buffers.

In a preferred embodiment, system 100 is provided with a special disk reading means or device driver having a disk reading method or program—CD_READXL. The device driver may be embodied in ROM 109 and/or embodied on storage media, e.g., disk 105 or optical storage media 106a.

CD_READXL begins a read operation from the drive by seeking to the desired source location. Unlike ordinary read techniques, however, once the data are ready CD_READXL determines the destination(s) for the data by traversing the transfer list. The transfer list is a linked list comprising a standard *Amiga Exec* style MinList that contains any number of separate MinNodes describing the transfer of data. *Amega Exec* (the kernel of the Amiga operating system) and the operation of MinLists and MinNodes are described in *Amiga ROM Kernel Reference Manual: Includes and Autodocs*, Addison Wesley, 1989, and *Amiga ROM Kernel Reference Manual: Library and Devices*, Addison Wesley, 1990, the disclosures of which are hereby incorporated by reference. For an overview of *Amiga Exec*, MinLists, and MinNodes, see Holloway, T., *The Object-Oriented Amiga Exec*, BYTE, January 1991, pp. 329–334, provided hereinbelow as Appendix B.

The operation of CD_READXL and CDXL transfer lists will now be described in detail.

1. Data Structures

CD_READXL employs the following I/0 request field format:

ior.io_Command=CD_READXL;

ior.io_Offset=SectorNumber;

ior.io_Length=SectorCount;

ior.io_Data=XferList;

The io_Command field identifies the command name.

The io_Offset field contains the starting position for the read. Any suitable addressing scheme may be used, e.g., a 32-bit word. In a preferred embodiment, disk offsets are addressed as logical sector numbers within the CD-ROM track.

The io_Length field limits the total number of sectors to be read. This number is calculated from the number of bytes to be transferred in the list, or it can be specified as −1 indicating no limit. In the latter case, the drive operation will be aborted when the transfer list is completed. When a zero length is used, a seek is performed but no data are read.

The io_Data field points to the transfer list. The stored pointer is not limited to a list header. It may point to any node within the list, hence partial lists or circular lists can be used.

Each node in a CDXL transfer list contains information regarding a destination for a portion of the data to be read. There is one node for each separate data buffer. A header file is defined to contain the key structure:

```
struct CDXL
{
    struct    MinNode    *Node;
    UWORD     *Buffer;
    ULONG     Length;
    FUNC      DoneCode;
    ULONG     Actual;
};
```

The members of the CDXL structure function as follows. The MinNode structure is used for list linking by the Exec list functions, including AddHaad( ), AddTail( ), RemHead( ), Insert( ), and Remove( ).

The Buffer pointer determines the location to store data being read. In a preferred embodiment, it is word aligned by even number. The buffer (pointed to) is filled with the number of bytes specified in the Length field. Preferably, the length should also be an even number (because it is two times the number of words). Optionally, the buffer pointer may be zero. In this case, the data are read from a CD but discarded, e.g., into a bit bucket. This feature is quite useful for skipping unused areas of the CD without terminating a continuous read operation.

Upon reading the specified number of bytes, the DoneCode function callback is executed. The callback function is executed as part of interrupt handling. In a preferred embodiment, it runs in *Amiga Exec* supervisor mode on the supervisor stack; all normal interrupt code restrictions apply. A NULL in the DoneCode field is considered a no-op, i.e., no callback function is executed. To avoid CD DMA channel timeouts, callback functions should be succinct.

Finally the Actual field indicates the number of bytes actually read into the buffer. Normally, this is the same as Length. If an error has occurred or Length is examined before the completion of a read, however, Length and Actual will differ. If a zero Length is specified, no transfer occurs and callback is invoked immediately.

Upon completing the transfer list, the Exec DoIO( ) or sendIO( ) functions can be used to start the transfer.

There are several advantages to using the transfer lists as taught by the present invention. The application developer has complete flexibility in ordering and selecting locations for data buffers. Transfer lists can be built anywhere in memory—they need not be next to or part of the buffers. Because the nodes are linked together at run time, a developer can create and modify the order of nodes to suit his/her own requirements.

In organizing CD sectors and CDXL transfer lists, consideration must be given to the sizes, locations, and timing relationships of the particular data. Therefore, the exact form of a transfer list will depend entirely on how a developer wishes to partition data and the buffer(s) to which it must be distributed.

2. CD_READXL Method

Figure 3:
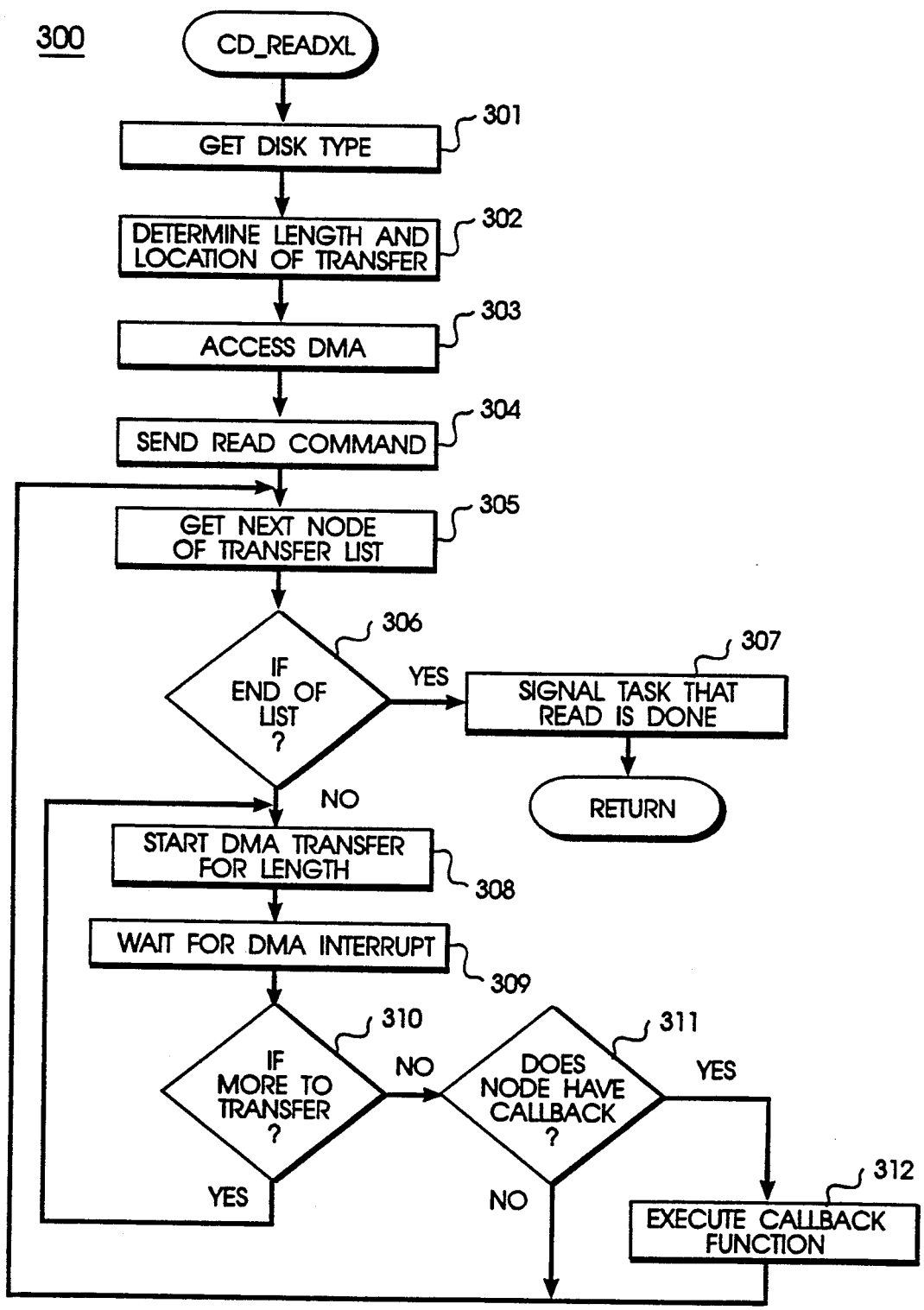
FIG. 3 is a flowchart of the CD_READXL method.

Referring now to FIGS. 3–8, the operation of the CD_READXL method will now be described. In FIG. 3 there is shown a flowchart of the CD_READXL method or procedure 300. In step 301, the current disk in CD drive 106 is tested to confirm that it is a CD-ROM or other specified media; if not, an error is returned. In step 302, Length and Offset (sector location)

of the overall read are fetched from the I/0 request block: ior.io_Length (SectorCount) and ior.io_offset (SectorNumber). In step 303, the Direct Memory Access (DMA) semaphore (Appendix B) is obtained for accessing the DMA controller hardware. In step 304, a READ command is sent to CD drive 106. In step 305, the CD transfer list pointer is fetched, thereby giving the next node of the transfer list. In step 306, if the end of the list has been reached, then in step 307 the procedure returns after signaling that the READ is done. In step 308, the CDXL transfer is started for Length (StartXL method). In step 309, the procedure awaits a signal—the DMA interrupt—that the read has finished or an error has occurred. If there is more data to transfer in step 310, then the procedure loops to step 308. Otherwise, at step 311 the node is checked to see if it has a pointer to a callback function (DoneCode). If yes at step 311, then the callback function is executed in step 312 and the procedure loops to step 305 to get the next node. Otherwise, the procedure loops back to step 305 without executing a callback function.

Figure 4:
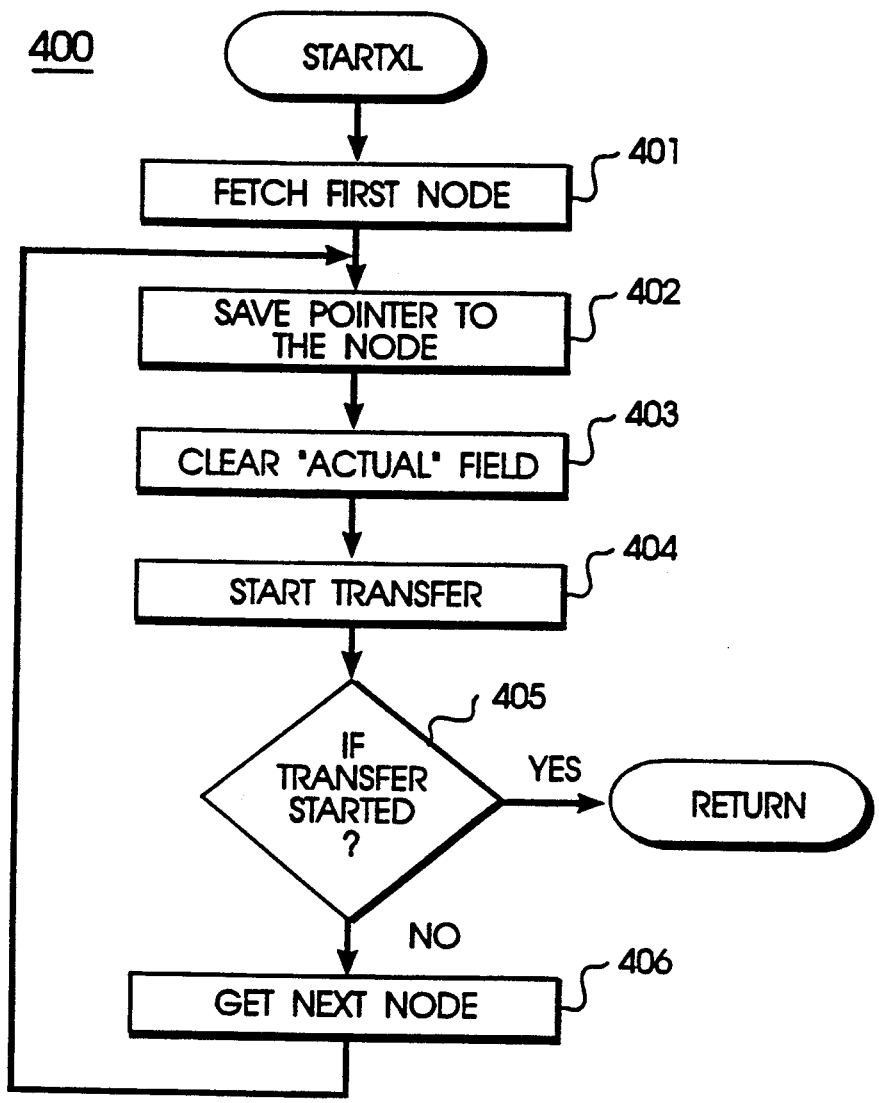
FIG. 4 is a flowchart of the StartXL method.

Referring to FIG. 4, there is shown a flowchart of the StartXL method or procedure 400 which is called in step 308 above. StartXL 400 initiates the actual transfer, including obtaining the first valid entry of the transfer list. In step 401, the procedure fetches the first node from the transfer list, and in step 402 a pointer to the node is saved. In step 403, the Actual field of the node is cleared. In step 404, data transfer is started (StartTransfer method). In step 405, the procedure returns if the transfer has started. Otherwise (no at step 405), the procedure advances to the next node at step 406 and then loops to step 402.

Figure 5:
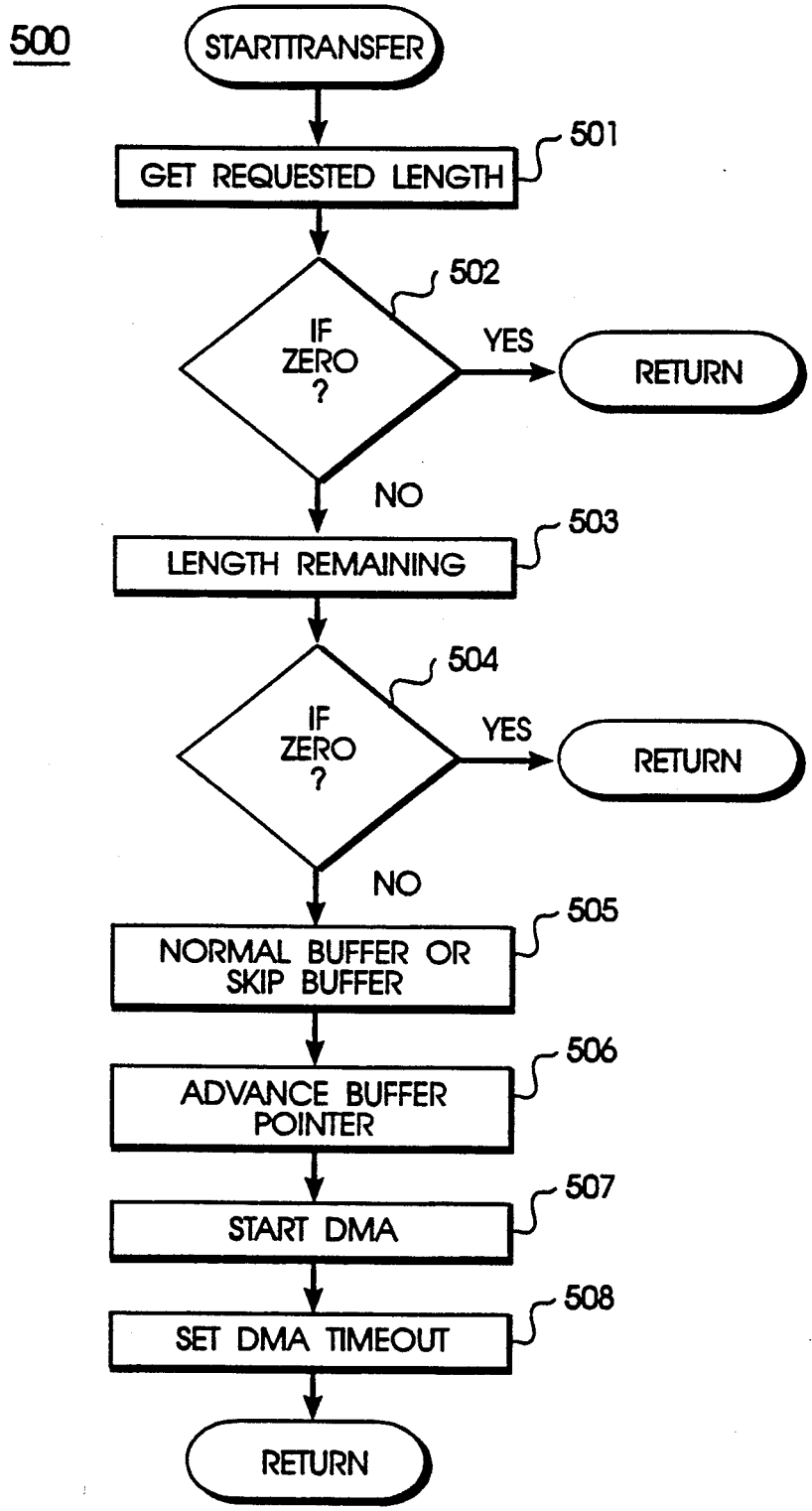
FIG. 5 is a flowchart of the StartTransfer method.

Referring to FIG. 5, there is shown a flowchart of the StartTransfer method or procedure 500 which is executed in step 404. StartTransfer divides large transfer lengths into several smaller ones which meet the limitations of the hardware; it also advances the Buffer pointer to the proper position within the buffer. In step 501, the number of bytes to transfer (XL_LENGTH) is determined for the current node of the transfer list. If this number is zero at step 502, then the procedure returns. In step 503, the procedure determines how many more bytes need to be transferred for the current node (Actual-Length). If this number is zero, then at step 504 the procedure returns. In step 505, the size of the transfer (for this node) is determined to be either a "normal buffer transfer" or a "skip buffer" (Buffer is NULL). In the latter case, the data transferred to the buffer will be ignored. In step 506, the Buffer pointer is advanced for this portion of the transfer; if no buffer is specified, a skip buffer is used. In step 507, the DMA transfer is started (StartDMA), and in step 508 a DMA timeout is set.

Figure 6:
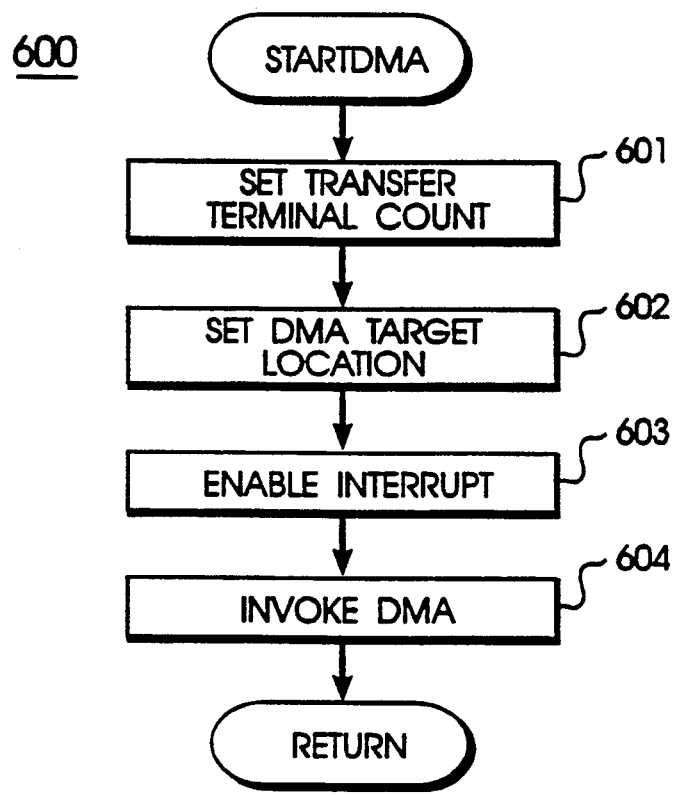
FIG. 6 is a flowchart of the StartDMA method.

Referring to FIG. 6, a flowchart is shown of the StartDMA method 600 (step 507), the procedure for interfacing the DMA hardware. In step 601, a DMA transfer terminal count (hardware register) is set equal to the value determined in step 503. In step 602, the DMA target location (hardware register) is set equal to the buffer of step 506. In step 603, the DMA terminal count interrupt (hardware register) is enabled. In step 604, DMA is invoked by setting the DMA hardware register.

After step 604, the DMA chip waits for data to arrive from CD drive 106. The DMA moves data without involving CPU 101. Each byte is processed by a request/acknowledge handshake, a technique which is known in the art. If a timeout error occurs, the operation is aborted.

DMA transfer should include appropriate interrupt handling. In a preferred embodiment, a transfer terminal counter and a transfer done interrupt are used. When the transfer terminal counter reaches zero, a DMA interrupt procedure (DMAInterrupt) is invoked.

Figure 7:
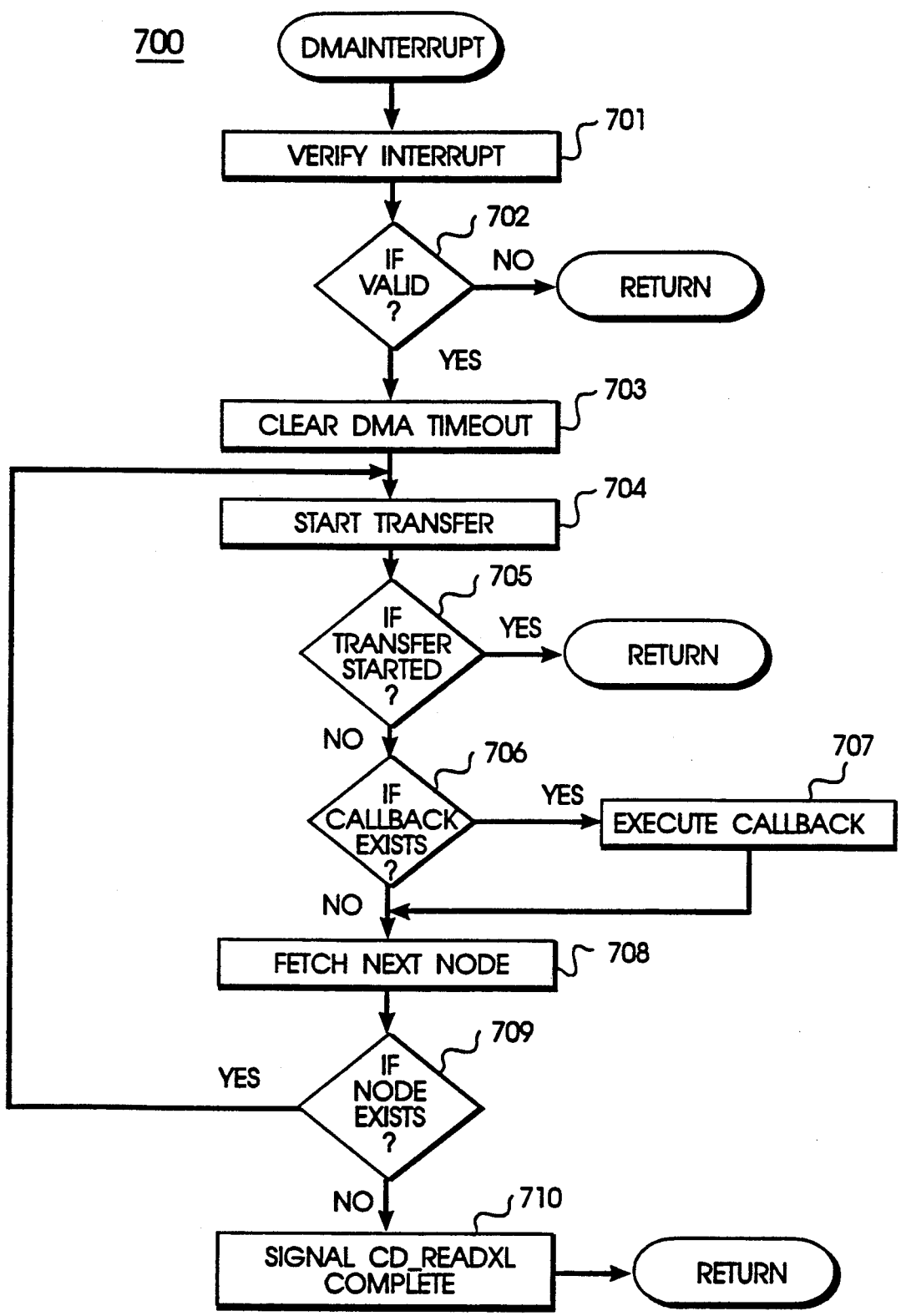
FIG. 7 is a flowchart of the DMAInterrupt method.

Referring now to FIG. 7, there is shown a flowchart of DMAInterrupt procedure 700. In step 701, the interrupt is verified. The procedure returns at step 702 for invalid interrupts. In step 703, the DMA timeout is cleared. In step 704, the StartTransfer procedure is called again. In step 705, if the transfer has started, the procedure returns. Otherwise, the procedure continues on to step 706. In step 706, if a callback function exists (function pointer defined in the DoneCode field), the callback function is invoked at step 707. Otherwise, the procedure skips step 707. In step 708, the next node is fetched. At step 709, if the node exists the procedure loops back to step 704. Otherwise (no node), at step 710 a signal is sent to CPU 101 indicating that the CD_READXL method has been completed.

Figure 8:
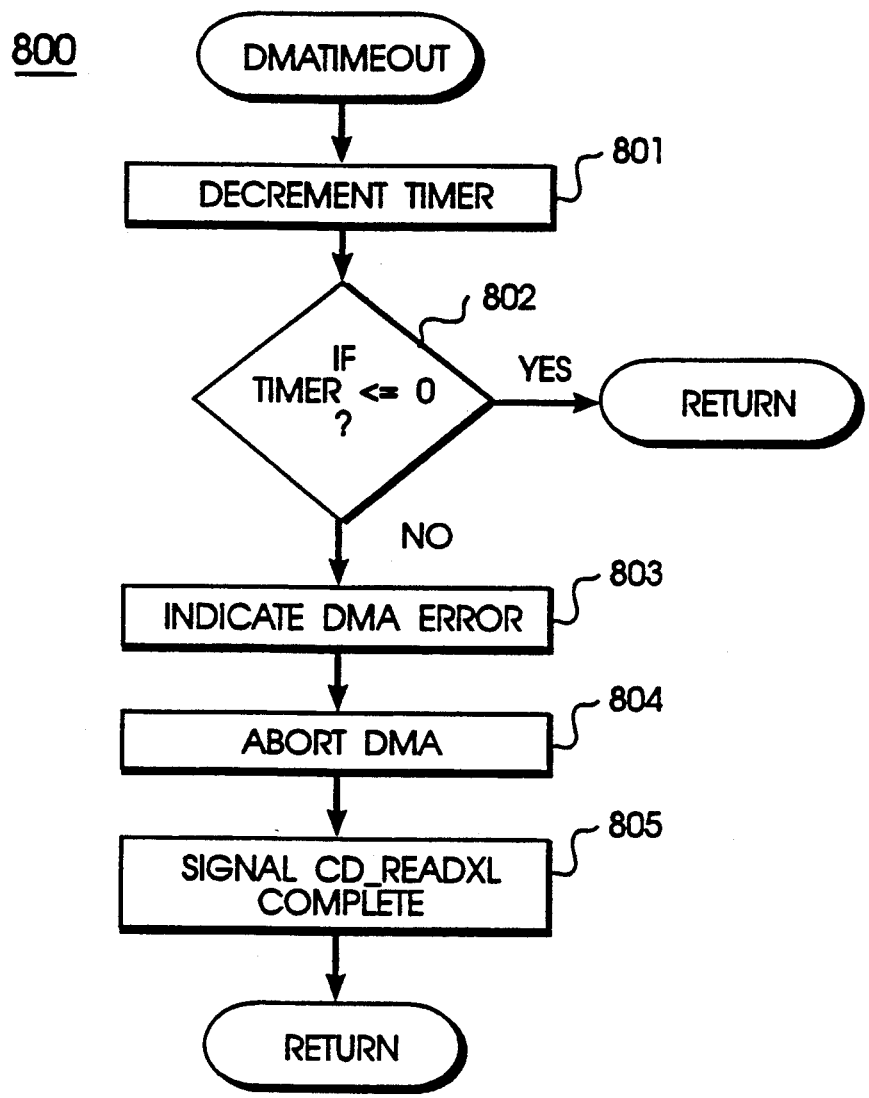
FIG. 8 is a flowchart of the DMATimeout method.

If a DMA transfer time is excessively long, a timeout should occur. Referring to FIG. 8, there is shown a DMATimeout procedure 800 which is called at regular intervals for processing timeouts. In step 801, the DMA timeout timer is decremented. In step 802, if the timer is not less than or equal to zero, then the procedure returns. Otherwise (no at step 802), a DMA error is indicated to the device driver. In step 804, the DMA operation is aborted: the DMA interrupt is disabled, any DMA transfer is halted, the terminal transfer count is cleared, and the DMA interrupt is cleared. In step 805, a signal is sent to CPU 101 indicating that the CD_READXL method has been completed.

List Construction: Application examples

The following examples are offered by way of illustration and not limitation. As an introductory CDXL example, consider a program with data requirements in the order of:

48 full-color video images (e.g., total size of 48k)

20 stereo sound (e.g., total size of 40k) From the C language (Kernighan, B., and Ritchie, D., The C Programming Language, Second Edition, Prentice Hall, 1988), the elements for a transfer list may be built from static structures:

```
struct MinList XferList;
struct CDXL ImageXL =
{
        NULL,NULL,       /* Linkage   */
        ImageBuf,        /* Buffer    */
        48*1024,         /* Length    */
        NULL,            /* DoneCode  */
        0                /* Actual    */
};
struct CDXL SoundXL =
{
        NULL,NULL,       /* Linkage   */
        SoundBuf,        /* Buffer    */
        20*2024,         /* Length    */
        NULL,            /* Donecode  */
        0                /* Actual    */
};
```

The structures would then be linked together with:

```
NewList(&XferList);
AddTail(&XferList,&ImagesXL);
```

-continued
```
AddTail(&XferList,&SoundXL);
```

A generally more useful approach would be to create a function for creating new list elements:

```
struct CDXL *NewXL(lst,buf,len,code)
    struct MinList *lst;
    UWORD *buf;
    ULONG len;
    FUNC code;
{
    struct CDXL *x;
    x = malloc(sizeof(struct CDXL));
    if (x == NULL) Error(No_MEM);
    x->Buffer = buf;
    x->Length = len;
    x->DoneCode = code;
    AddTail(lst,x);
    return x;
}
```

The new initialization becomes:

```
NewList(&XferList);
NewXL(&XferList,ImageBuf,48*1024,NULL);
NewXL(&XferList,SoundBuf,20*1024,NULL);
``` and adding new elements would be as simple as adding a new line. Of course for both of these structures the CD should be laid out accordingly.

As another example, consider 40 full-color video images for display as quickly as possible. Since each image occupies 48k (ignoring compression techniques for simplicity), 3.125 images can be read per second. It is assumed that the CD is mastered so that all 40 images are sequentially positioned within the same file or sequentially arranged files (e.g., when images are mod 2048, 40 separate files positioned adjacent to one another). Since it is desirable to double buffer these images—reading the next image while the current image is displayed—two buffers are established and alternate images are read into alternate buffers.

Next, the transfer list is built. Creating it in a normal fashion would require 40 entries, 20 for each buffer. There is, however, an easy technique that will reduce this effort. Two entries are created, one for each buffer, and the list is made circular. To do this a new function is defined:

```
LoopList(lst)
    struct List *lst;
{
    struct Node *head = lst->lh_Head;
    struct Node *tail = lst->lh_Tail;
    if (head->ln_Succ == NULL) return; /* empty */
    head->ln_Pred = tail;
    tail->ln_Succ = head;
}
```

Note that once this function has been executed, Exec AddHead( ), AddTail( ), RemHead( ), and RemTail( ) functions should not be used on the list. Insert( ) and Remove( ) may still be used however. The code now becomes:

```
NewList(&XferList);
NewXL(&XferList,ImageBuf1,48*1024,NULL);
```

-continued
```
NewXL(&XferList, ImageBuf2,48*1024,NULL);
LoopList (&XferList);
```

When the read is performed, the device driver loops endlessly through this list, filling one buffer then the other. The loop is broken when the driver has read all sectors specified in the io_Length field, or an AbortIO has occurred. A callback function which could count the reads and also break the loop may also be included.

Attached hereto is an Appendix A (which can be found in the application's file) containing source code listings providing a description of the invention suitable for use in a general purpose digital computer system, such as an Amiga personal computer (see attached Appendix B: "The Object-Oriented Amiga Exec" Which can be found in the application file) A suitable compiler for the source code, which is written in 68000 Assembler, is available from several vendors.

While the invention is described in some detail with specific reference to a single preferred embodiment and certain alternatives, there is no intent to limit the invention to that particular embodiment or those specific alternatives. The true scope of the invention is defined not by the foregoing description but by the following claims.

What is claimed is:

1. In a computer system having a memory and a optical storage means, said optical storage means interleaving a plurality of data objects into a location and said optical storage means having a plurality of locations sequentially arranged, a method for transferring the data objects into separate destinations in the memory comprising the steps of:
   (a) constructing a transfer list having a plurality of nodes, wherein said nodes include size and destination information of the data objects;
   (b) seeking once a data object at a location of the optical storage means;
   (c) determining from a next node a size and a destination address for the data object; and
   (d) transferring data from the data objects into the memory at said destination address, wherein said transferred data has a size equal to the size for the data object.

2. The method of claim 1, wherein said node includes a pointer to a next node in the transfer list, a pointer specifying memory location storing the data from the data object, a length of the data to transfer from the data object, and a length of the data actually transferred from the data object.

3. The method of claim 2, wherein said node further includes a pointer to a callback function.

4. The method of claim 2, wherein step (d) comprises transferring data from the data object into the memory by:
   (e) transferring the length of the data object if the next node exists;
   (f) reading the next node if the next node does not exist at step (e);
   (g) indicating the end of memory access if the next node does not exist at step (f); and
   (h) repeating step (e) for remaining data in the data object.

5. The method of claim 2, wherein step (b) comprises seeking a data object at a location of the optical storage means by determining the length and an offset of the data object; and sending a read command to the optical storage means.

6. In a computer system having a memory and a mass storage means, said mass storage means interleaving a plurality of data objects into a frame and said mass storage means having a plurality of frames sequentially arranged, a method for transferring interleaved data objects into separate destinations in the memory comprising the steps of:

(a) establishing a transfer list having a plurality of nodes, where each of the nodes includes a size and a destination address for one data object;

(b) seeking once a data object from a frame of the mass storage means;

(c) reading a node from the transfer list; and (d) transferring data from said one data object to said destination address, wherein said transferred data has a size equal to the size for said one data object.

7. The method of claim 6, further comprising the step of:

(e) repeating steps (c)–(d) for each of said data objects.

* * * * *